United States Patent
Muntean et al.

(10) Patent No.: US 10,352,071 B2
(45) Date of Patent: Jul. 16, 2019

(54) LOCKING ASSEMBLY FOR VEHICLE ARMREST

(71) Applicants: Stefan Muntean, Shelby, MI (US); Gregory A Wasek, Shelby Township, MI (US); Andrew Kuzdak, III, Rochester Hills, MI (US)

(72) Inventors: Stefan Muntean, Shelby, MI (US); Gregory A Wasek, Shelby Township, MI (US); Andrew Kuzdak, III, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 64 days.

(21) Appl. No.: 15/808,404

(22) Filed: Nov. 9, 2017

(65) Prior Publication Data
US 2019/0136592 A1    May 9, 2019

(51) Int. Cl.
| | |
|---|---|
| *B60R 7/04* | (2006.01) |
| *E05B 83/32* | (2014.01) |
| *E05C 9/08* | (2006.01) |
| *E05B 85/06* | (2014.01) |
| *E05C 7/02* | (2006.01) |
| *E05C 3/06* | (2006.01) |
| *B60N 2/75* | (2018.01) |

(52) U.S. Cl.
CPC ............. *E05B 83/32* (2013.01); *B60N 2/793* (2018.02); *B60R 7/04* (2013.01); *E05B 85/06* (2013.01); *E05C 3/06* (2013.01); *E05C 7/02* (2013.01); *E05C 9/085* (2013.01)

(58) Field of Classification Search
CPC ........... E05B 83/32; B60N 2/793; B60R 7/04; E05C 3/06; E05C 7/02; E05C 9/085
See application file for complete search history.

(56) References Cited

U.S. PATENT DOCUMENTS

| | | | |
|---|---|---|---|
| 3,893,585 A | 7/1975 | Morrison et al. | |
| 5,902,005 A | 5/1999 | Lewczyk et al. | |
| 6,439,634 B1 * | 8/2002 | Jensen | E05B 83/16 224/402 |
| 7,568,766 B2 | 8/2009 | Chen et al. | |
| 7,607,727 B2 | 10/2009 | Park | |
| 8,191,953 B2 | 6/2012 | Simon et al. | |
| 8,448,483 B2 | 5/2013 | Brant | |

(Continued)

FOREIGN PATENT DOCUMENTS

WO         2001012925 A1    2/2001

*Primary Examiner* — Lori L Lyjak
(74) *Attorney, Agent, or Firm* — Ralph E. Smith

(57) ABSTRACT

A vehicle storage compartment includes a base bin defining a storage cavity and configured to couple to a vehicle floor, a door coupled to the base bin and configured to move between a closed position and an open position, the door having a latch mechanism configured to selectively engage the base bin to facilitate maintaining the door in the closed position, and a locking assembly coupled to the door and configured to move between a locked position and an unlocked position. The locking assembly is configured to selectively engage the base bin in the locked position to facilitate preventing movement of the door from the closed position to the open position. The locking assembly is separate and independent of the latch mechanism such that the latch mechanism remains movable when the locking assembly is in the locked position.

16 Claims, 6 Drawing Sheets

(56) References Cited

U.S. PATENT DOCUMENTS

| | | | |
|---|---|---|---|
| 9,863,171 B1* | 1/2018 | Salter | B60R 7/04 |
| 2003/0057709 A1* | 3/2003 | Hupfer | B60R 7/04 |
| | | | 292/5 |
| 2007/0186598 A1 | 8/2007 | Najima | |
| 2008/0197648 A1* | 8/2008 | Smith | B60R 7/04 |
| | | | 296/24.34 |
| 2010/0012411 A1* | 1/2010 | Fiacchino | B62K 19/46 |
| | | | 180/89.11 |
| 2014/0054920 A1* | 2/2014 | Jeffries | B60J 7/198 |
| | | | 296/100.07 |
| 2014/0291372 A1* | 10/2014 | Smith | B60R 7/04 |
| | | | 224/539 |
| 2015/0035308 A1* | 2/2015 | Huebner | B60R 7/04 |
| | | | 296/37.8 |
| 2016/0024816 A1* | 1/2016 | Simon | B60R 7/04 |
| | | | 292/195 |
| 2016/0159289 A1* | 6/2016 | Gaudig | E05B 83/32 |
| | | | 296/37.8 |
| 2016/0280144 A1* | 9/2016 | Hemphill | B60P 7/08 |

* cited by examiner

LOCKING ASSEMBLY FOR VEHICLE ARMREST

FIELD

The present application relates generally to vehicle storage compartments and, more particularly, to a locking assembly for a vehicle center console armrest.

BACKGROUND

Vehicle interiors typically include storage compartments, such as a glove box or a center console, to store various items. Some storage compartments are lockable to prevent unintentional opening or unauthorized access thereto. However, the locks and opening latches typically interact with each other, which can provide a less robust locking arrangement. While such latch and locking systems work well for their intended purpose, it is desirable to provide continuous improvement in the relevant art.

SUMMARY

According to one example aspect of the invention, a vehicle storage compartment is provided. The vehicle storage compartment includes, in one exemplary implementation, a base bin defining a storage cavity and configured to couple to a vehicle floor, a door coupled to the base bin and configured to move between a closed position and an open position, the door having a latch mechanism configured to selectively engage the base bin to facilitate maintaining the door in the closed position, and a locking assembly coupled to the door and configured to move between a locked position and an unlocked position. The locking assembly is configured to selectively engage the base bin in the locked position to facilitate preventing movement of the door from the closed position to the open position. The locking assembly is separate and independent of the latch mechanism such that the latch mechanism remains movable when the locking assembly is in the locked position.

In addition to the foregoing, the described storage compartment may include one or more of the following features: wherein the locking assembly includes a housing coupled to the door, the housing defining a lock cavity and a transverse locking arm slot; wherein the locking assembly includes a lock link disposed within the lock cavity, and first and second locking arms disposed within the transverse locking arm slot; wherein a lock and tumbler is disposed within a bore formed in the lock link; wherein the lock and tumbler is configured to receive a vehicle key; and wherein the first and second locking arms are rotatably coupled to the housing; and wherein the first and second locking arms are rotatably coupled to each other.

In addition to the foregoing, the described storage compartment may include one or more of the following features: wherein the first locking arm includes a main body, a connecting arm extending from the main body and coupled to the second locking arm, and a latch arm extending from the main body and having a catch configured to selectively engage a first bin striker of the base bin; wherein the first locking arm main body includes an aperture, wherein a pin extends through the aperture to rotatably couple the first locking arm to the housing.

In addition to the foregoing, the described storage compartment may include one or more of the following features: wherein the second locking arm includes a main body, a connecting arm extending from the main body and coupled to the connecting arm of the first locking arm, and a latch arm extending from the main body and having a catch configured to selectively engage a second bin striker of the base bin; wherein the second locking arm main body includes an aperture, wherein a pin extends through the aperture to rotatably couple the second locking arm to the housing; wherein the latch mechanism is rotatably coupled to the housing; and wherein the latch mechanism includes a pawl rotatably coupled to the housing, a handle portion coupled to the pawl, and a latch arm configured to selectively engage the base bin to facilitate maintaining the door in the closed position.

According to another example aspect of the invention, a vehicle storage compartment is provided. The storage compartment includes, in one exemplary implementation, a base bin defining a first storage cavity and configured to couple to a vehicle floor, a storage tray defining a second storage cavity and coupled to the base bin, the storage tray configured to move between a closed position and an open position, the storage tray having a first latch mechanism configured to selectively engage the base bin to facilitate maintaining the storage tray in the closed position, an armrest door coupled to the base bin and configured to move between a closed position and an open position, the armrest door having a second latch mechanism configured to selectively engage the base bin to facilitate maintaining the armrest door in the closed position, and a locking assembly coupled to the armrest door and configured to move between a locked position and an unlocked position. The locking assembly is configured to selectively engage the base bin in the locked position to facilitate preventing movement of the armrest door from the closed position to the open position. The locking assembly is mechanically separate and independent of the first and second latch mechanisms such that the first and second latch mechanisms remain movable when the locking mechanism is in the locked position.

In addition to the foregoing, the described storage compartment may include one or more of the following features: wherein the storage tray and the armrest door are hingedly coupled to the base bin.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

The present application is directed to a locking assembly for a vehicle storage compartment. The locking assembly is operable with a vehicle key and is separate and independent of any latching mechanisms of the storage compartment. This enables locking directly to the storage compartment base rather than the latch, thereby improving locking retention and avoiding abusive latch loads.

Figure 1:
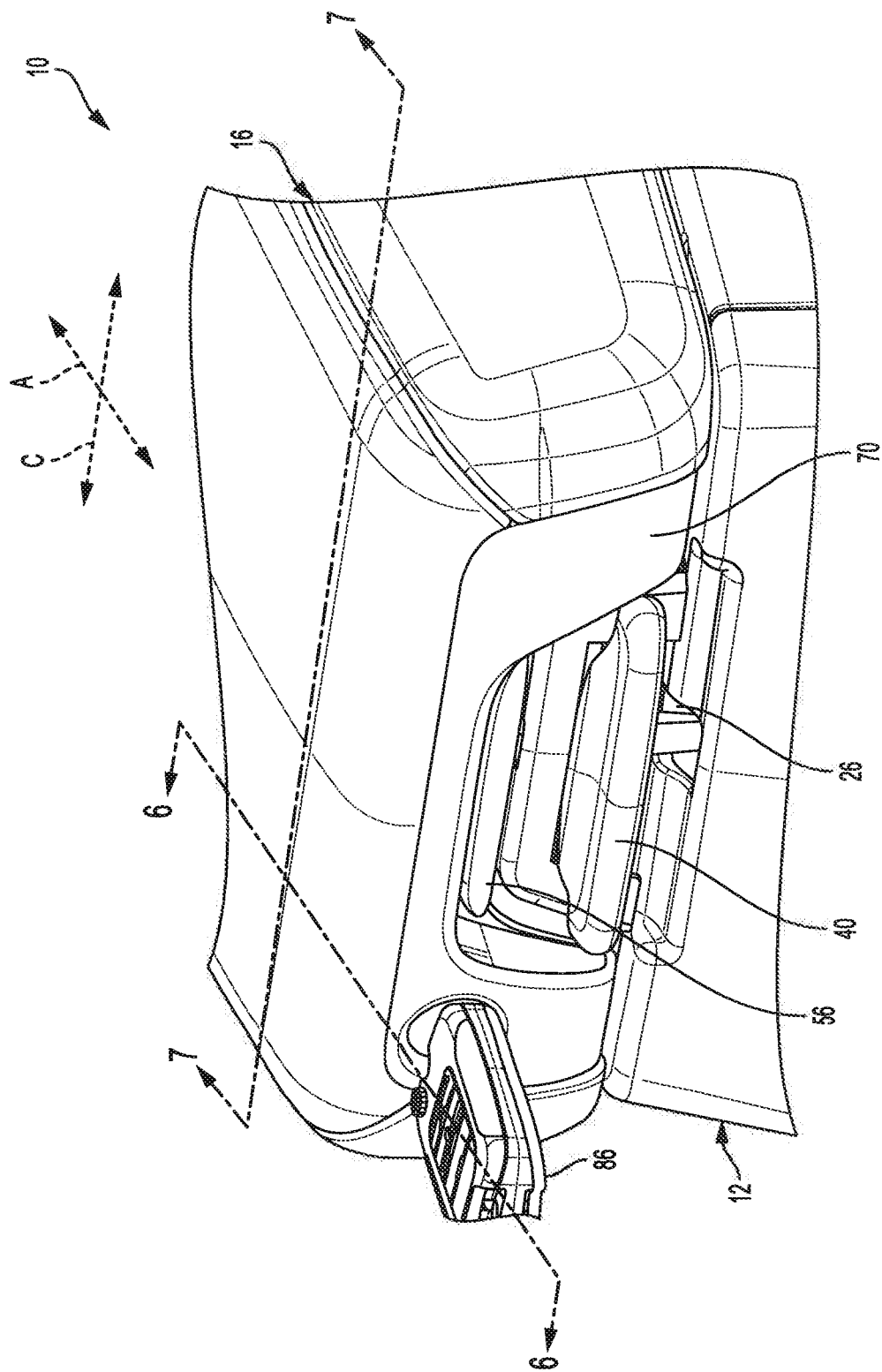
FIG. 1 is a schematic illustration of an example vehicle storage compartment in a closed position, in accordance with the principles of the present disclosure.
Figure 2B:
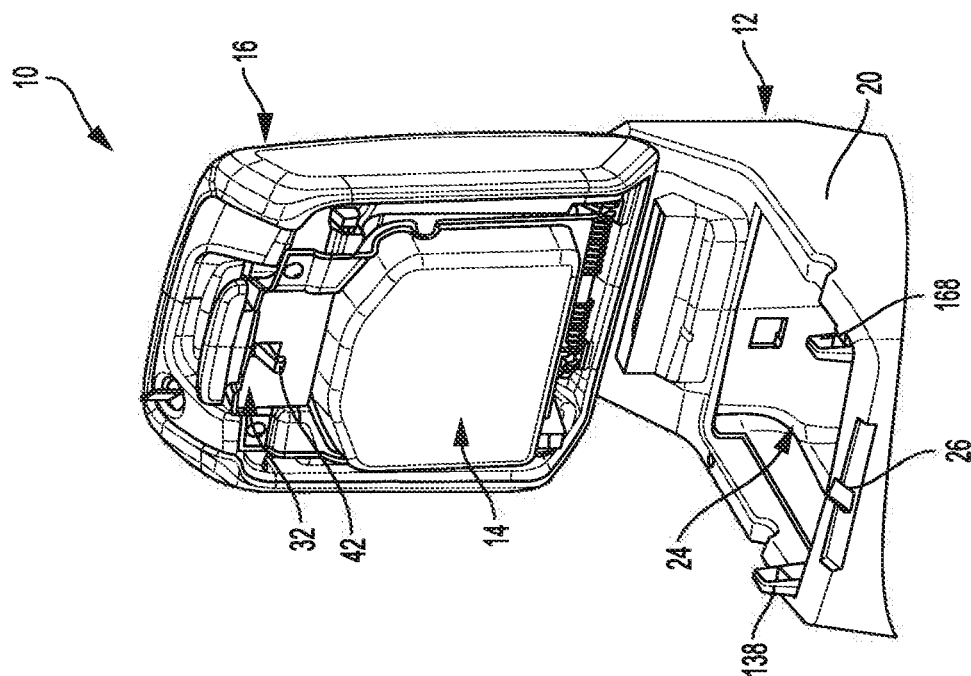
FIG. 2B is a schematic illustration of the vehicle storage compartment shown in FIG. 1 in a second open position, in accordance with the principles of the present disclosure.
Figure 2A:
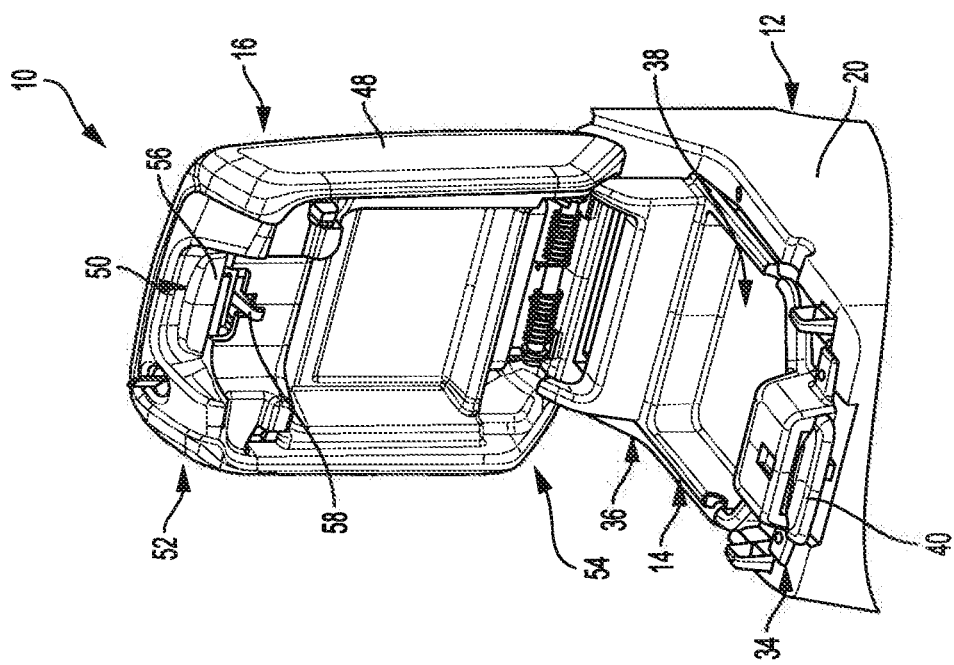
FIG. 2A is a schematic illustration of the vehicle storage compartment shown in FIG. 1 in a first open position, in accordance with the principles of the present disclosure.

With initial reference to FIGS. 1, 2A, and 2B, an example vehicle storage compartment is illustrated and generally identified at reference numeral 10. In the example embodiment, the vehicle storage compartment 10 is illustrated as a center console configured to be disposed between a driver seat and front passenger seat (not shown). However, it will be appreciated that the described storage compartment, particularly the mechanical assemblies thereof, may be utilized in various other areas or storage compartments of the vehicle.

In the example embodiment, the storage compartment 10 generally includes a base bin 12, a storage tray 14, a top armrest cover or door 16, and a separated locking assembly 18. As shown in FIGS. 1 and 2, the armrest door 16 is movable from a closed position (FIG. 1) to an open position (FIG. 2A) to provide access to storage area defined in the storage tray 14. Similarly, the storage tray 14 is movable (along with armrest door 16) from a closed position (FIGS. 1 and 2A) to an open position (FIG. 2B) to provide access to another storage area defined in the base bin 12. As such, storage compartment 10 defines two separately accessible storage areas in a single center console. As described herein in more detail, the locking assembly 18 is separated and independent from the latching systems of the storage tray 14 and the armrest door 16.

The base bin 12 generally includes a body 20 that is coupled to a vehicle floor (not shown) and defines a storage cavity 24. A striker or catch 26 is further defined in the body 20 and is configured to releasably receive a portion of the storage tray 14 to secure the storage tray 14 to the base bin 12 when in the closed position.

In the example embodiment, storage tray 14 generally includes a body 30 and a latch mechanism 32. The body 30 includes a forward end 34, a rearward end 36, and defines a relatively smaller storage cavity 38. The rearward end 36 is hingedly coupled to the base bin 12 such that storage tray 14 is movable between the open and closed positions. The latch mechanism 32 is rotatably coupled to the body forward end 34 and includes a handle portion 40 and a latch arm 42. The handle portion 40 and latch arm 42 can be biased (e.g., with a biasing mechanism) to a closed position where the latch arm 42 is positioned to engage the base bin 12. Movement of the latch mechanism 32 to an open position disengages the latch arm 42 from the base bin 12.

In the closed position of both the storage tray 14 and latch mechanism 32, the latch arm 42 is received within and/or engages the base bin catch 26 such that the storage tray forward end 34 cannot be moved upward and away from the base bin 12. To move the storage tray 14 to the open position, a user pulls the handle portion 40 upward to the opening position, thereby rotating the latch arm 42 away from engagement with the base bin catch 26. This enables the user to then rotate the storage tray 14 upward to the open position and provide access to the base bin storage cavity 24.

In the example embodiment, armrest door 16 generally includes a body 48 and a latch mechanism 50. The body 48 includes a forward end 52, and a rearward end 54 hingedly coupled to the base bin 12 such that armrest door 16 is movable between the open and closed positions. The latch mechanism 50 is rotatably coupled to the body forward end 52 and includes a handle portion 56 and a latch arm 58. The handle portion 56 and latch arm 58 can be biased (e.g., with a biasing mechanism) to a closed position where the latch arm 58 is positioned to engage the base bin 12 and/or the storage tray 14. Movement of the latch mechanism 50 to an open position disengages the latch arm 58 from the base bin 12 and/or storage tray 14.

In the closed position of both the armrest door 16 and latch mechanism 50, the latch arm 58 is received within and/or engages a storage tray catch such that the armrest door forward end 52 cannot be moved upward and away from the base bin 12 and/or the storage tray 14. To move the armrest door 16 to the open position, the user pulls the handle portion 56 upward to the opening position, thereby rotating the latch arm 58 away from engagement with the base bin 12 and/or storage tray 14. This enables the user to then rotate the armrest door 16 to the open position and provide access to the storage tray storage cavity 38.

With further reference to FIGS. 3-7, the locking assembly 18 will be described in more detail. As previously described, the locking assembly 18 is separate and independent of the latch mechanisms 32, 52, thereby enabling locking directly to the storage compartment base bin 12 rather than a latch, thereby improving locking retention and avoiding abusive latch loads With particular reference to FIG. 3, the locking assembly 18 generally includes a housing 60, a lock and tumbler 62 (FIG. 6), a lock link 64, a first locking arm 66, and a second locking arm 68.

In the example embodiment, housing 60 is coupled to and/or formed as part of the armrest door 16. A bezel 70 is coupled to a front face 72 of the housing 60 (e.g., facing a front of the vehicle). In the illustrated embodiment, housing 60 is coupled to the armrest door body forward end 52, and the latch mechanism 50 is rotatably coupled to the housing 60. For example, the latch mechanism 50 includes a pawl 74 rotatably coupled to the housing by a pin 76 extending in a direction along a cross-car axis 'A'. In one example, the handle portion 56 is coupled to the pawl 74, however, the pawl 74 and handle portion 56 can alternatively be formed as an integral part. Similarly, the latch arm 58 can be coupled to or integrally formed with the pawl 74. The latch mechanism 50 is biased into the closed position by a biasing mechanism 78 (e.g., a spring).

In the example embodiment, the housing 60 defines a bore or lock cavity 80 and a transverse locking arm slot 82. The housing 60 and lock cavity 80 are configured to receive and rotatably support the lock link 64, and the housing 60 and transverse locking arm slot 82 are configured to receive and rotatably support the first and second locking arms 66, 68.

Figure 6:
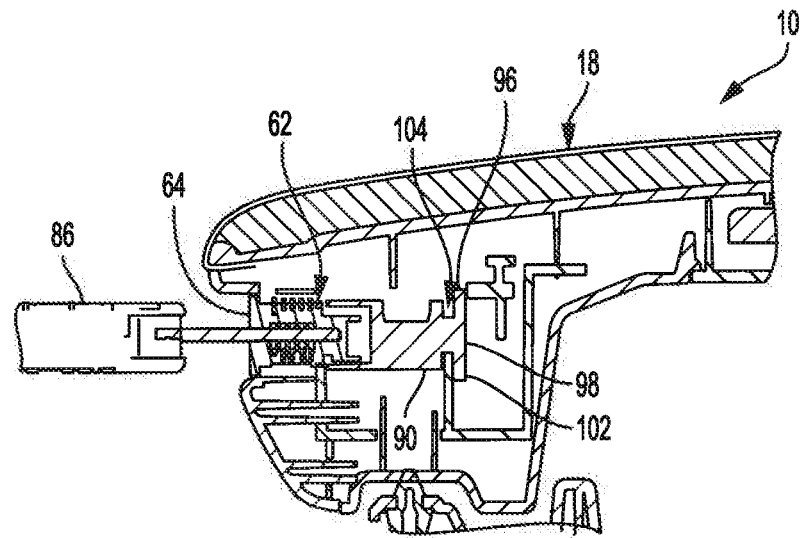
FIG. 6 is a cross-sectional view of the vehicle storage compartment shown in FIG. 1 and taken along line 6-6, in accordance with the principles of the present disclosure.

The lock and tumbler 62, shown in FIG. 6, is configured to fit within a bore 84 (FIG. 3) formed in the lock link 64. The lock and tumbler 62 is further configured to receive a key such as, for example, a vehicle key 86 (FIGS. 1 and 6). After insertion into lock 62, subsequent rotation of vehicle key 86 rotates the lock link 64, for example, as shown by arrow 'B' in FIG. 7.

In the example embodiment, the lock link 64 includes a generally cylindrical body 90 having a first end 92 and an opposite second end 94. The body 90 is disposed within the lock cavity 80 of housing 60 such that first end 92 is proximate the housing front face 72 and bezel 70. Body first end 92 defines bore 84, which is configured to receive the lock and tumbler 62. In this way, lock link 64 positions the lock and tumbler 62 at a forward facing portion of the vehicle storage compartment 10 to provide the user convenient access thereto.

Figure 3:
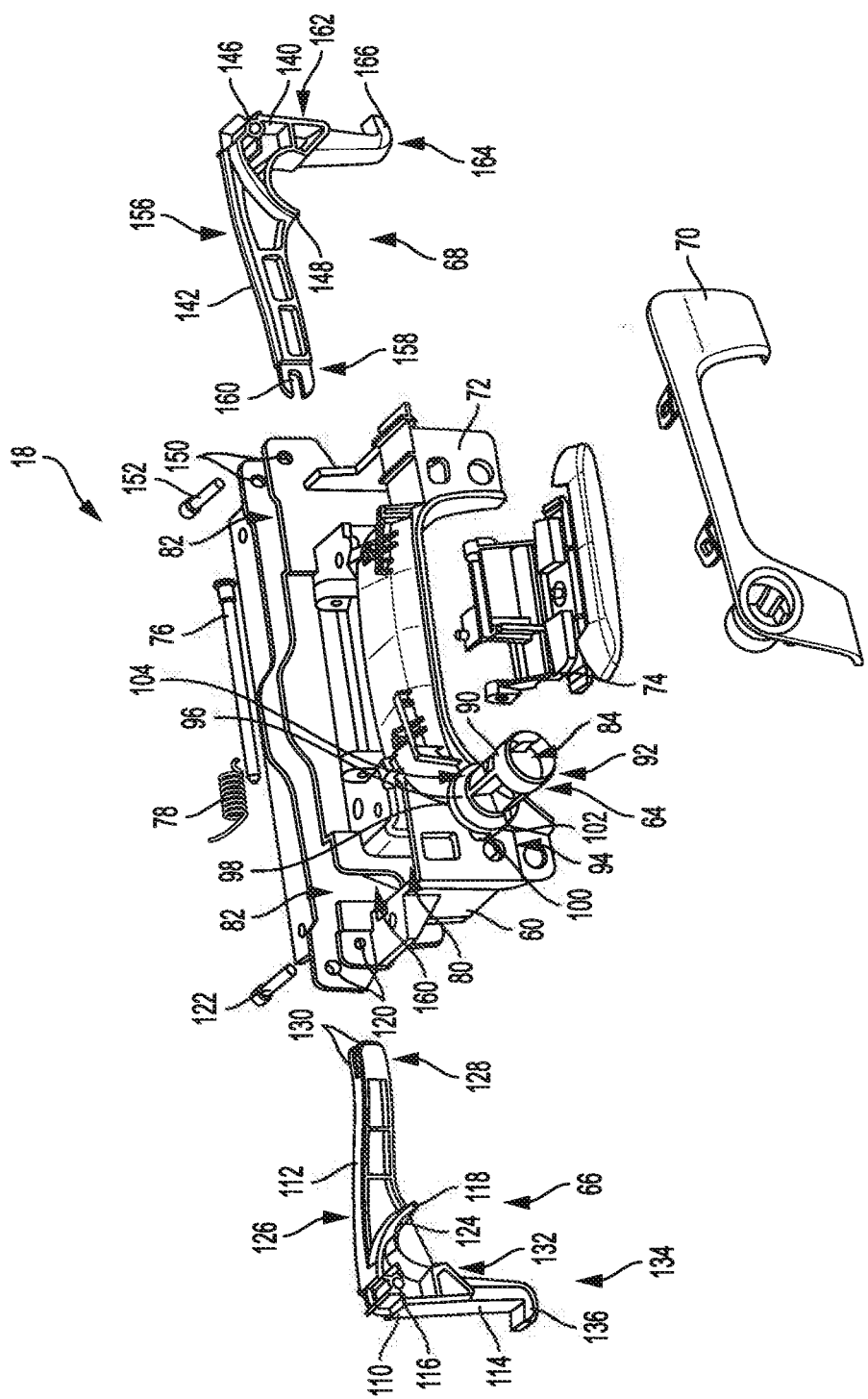
FIG. 3 is an exploded view of an example locking assembly of the vehicle storage compartment shown in FIG. 1, in accordance with the principles of the present disclosure.

The body second end 94 includes a disc member 96 having a rear surface 98 with a projection 100 extending therefrom. The projection 100 is disposed on an outer circumferential perimeter 102 of the rear surface 98 and extends parallel to or substantially parallel to a fore-aft vehicle axis 'C'. As shown in FIG. 3, lock link body 90 includes a necked down portion 104 configured to seat within a slot 106 formed in housing 60. As such, lock link 64 is at least partially rotatably supported by the housing 60 at the location of the slot 106.

Figure 4:
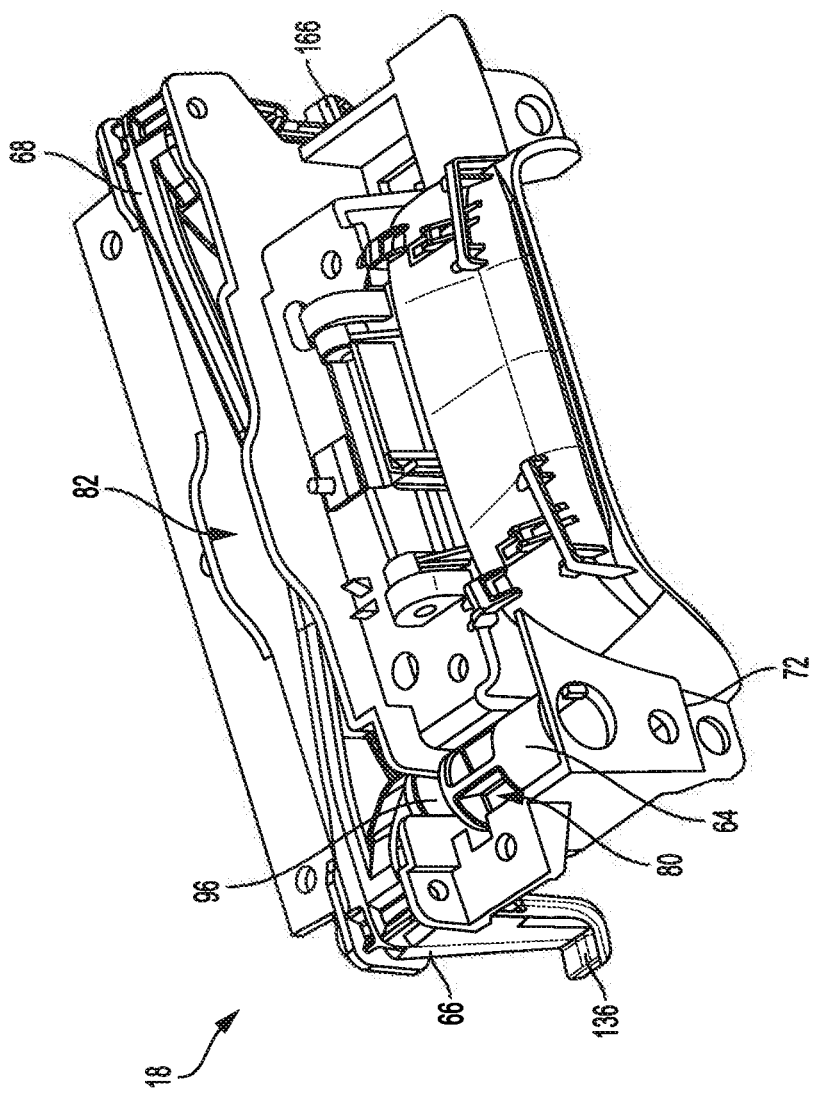
FIG. 4 is a front perspective view of the locking assembly shown in FIG. 3, in accordance with the principles of the present disclosure.
Figure 5:
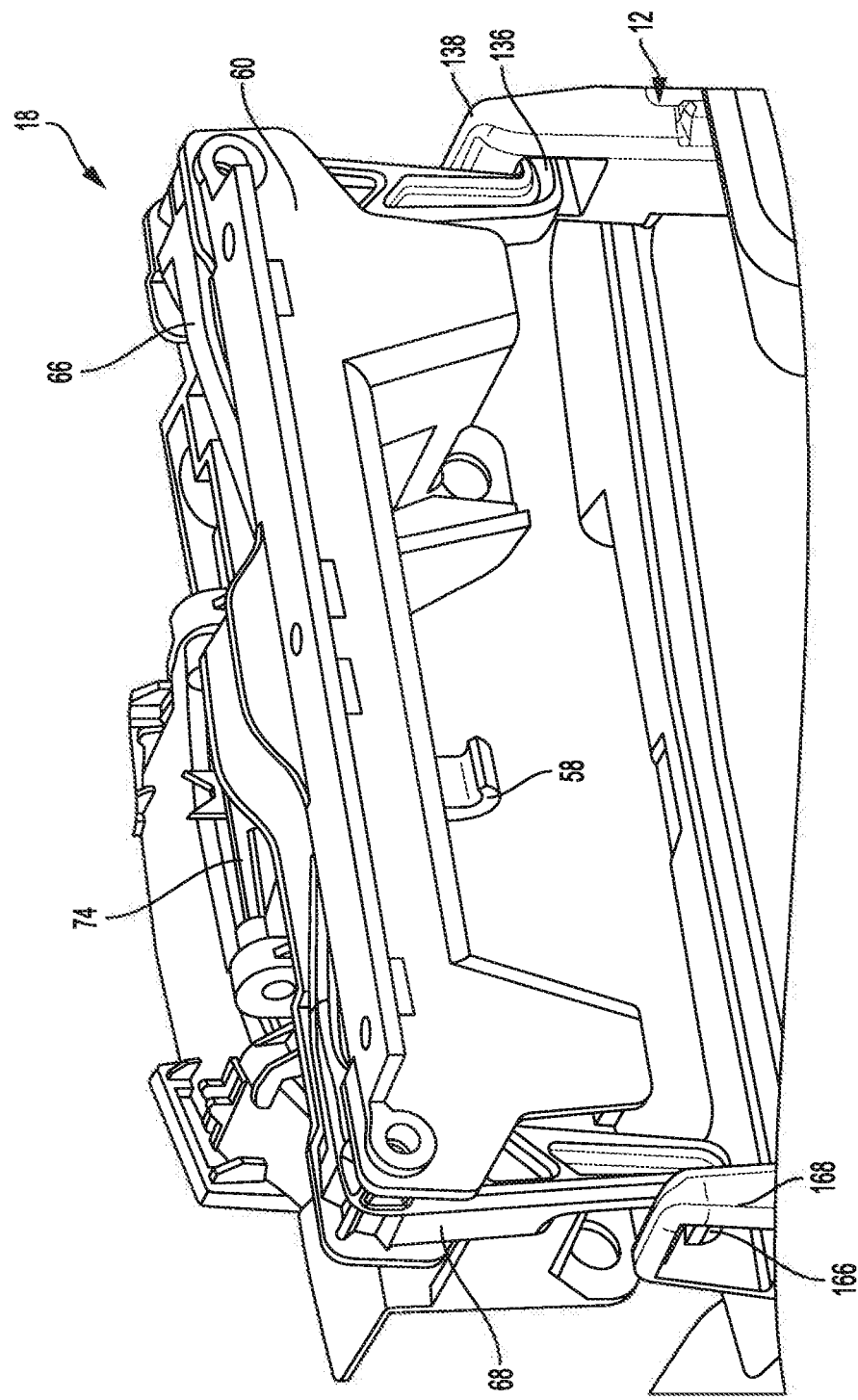
FIG. 5 is a rear perspective view of the locking assembly shown in FIG. 3, in accordance with the principles of the present disclosure.
Figure 7:
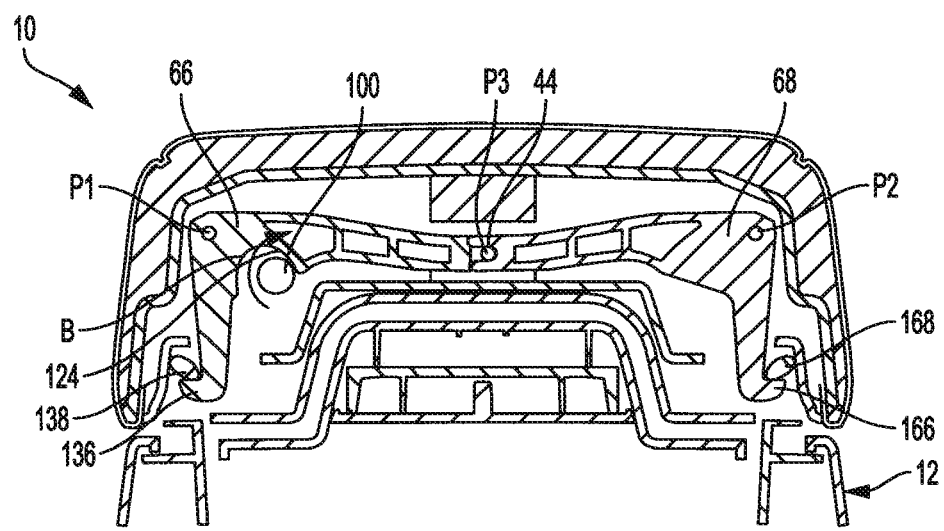
FIG. 7 is a cross-sectional view of the vehicle storage compartment shown in FIG. 1 and taken along line 7-7, in accordance with the principles of the present disclosure.

With continued reference to FIG. 3-5, in the example embodiment, the first locking arm 66 generally includes a main body 110, a connecting arm 112, and a latch arm 114. The main body 110 includes a receiving aperture 116 and a contact ramp 118. The first locking arm 66 is disposed within the transverse locking arm slot 82 such that receiving aperture 116 is aligned with a pair of apertures 120 (FIG. 3) formed in housing 60. A pin 122 extends through receiving aperture 116 and apertures 120 to rotatably couple the first locking arm 66 to the housing 60 about a pivot point 'P1' (FIG. 7). However, storage compartment 10 may have any suitable construction that enables locking arm 66 to function as described herein.

The contact ramp 118 extends outwardly from the main body 110 and defines a contact surface 124 configured to be selectively contacted by the lock link projection 100. For example, when lock link 64 is rotated clockwise (as shown in FIG. 7), lock link projection 100 moves upward and into contact with contact ramp 118, which causes counter-clockwise rotational movement of the first locking arm 66 about pivot point 'P1'.

The connecting arm 112 extends outwardly from the main body 110 and extends parallel to or substantially parallel to the cross-car axis 'A'. The connecting arm 112 generally includes a proximal end 126 and a distal end 128. The proximal end 126 is coupled to the main body 110, and the distal end 128 includes a pair of opposed flanges 130 with a pin 44 (FIG. 7) extending therebetween.

The latch arm 114 extends outwardly from the main body 110 and generally includes a proximal end 132 and a distal end 134. The proximal end 132 is coupled to the main body 110, and the distal end 134 includes a hook or catch 136 configured to selectively engage a bin striker 138 (FIG. 5).

In the example embodiment, the second locking arm 68 generally includes a main body 140, a connecting arm 142, and a latch arm 144. The main body 140 includes a receiving aperture 146 and a contact ramp 148 which may be utilized in a manner similar to contact ramp 118 if locking assembly 18 is arranged on the driver's side of storage compartment 10. The second locking arm 68 is disposed within the transverse locking arm slot 82 such that receiving aperture 146 is aligned with a pair of apertures 150 (FIG. 3) formed in housing 60. A pin 152 extends through receiving aperture 146 and apertures 150 to rotatably couple the second locking arm 68 to the housing about a pivot point 'P2' (FIG. 7). However, storage compartment 10 may have any suitable construction that enables second locking arm 68 to function as described herein.

The connecting arm 142 extends outwardly from the main body 140 and extends parallel to or substantially parallel to the cross-car axis 'A'. The connecting arm 142 generally includes a proximal end 156 and a distal end 158. The proximal end 156 is coupled to the main body 140, and the distal end 158 defines a slot 160 configured to receive the pin extending between the first locking arm connecting arm flanges 130. In this way, the connecting arms 112 and 142 are rotatably connected at distal ends 128, 158 about a pivot point 'P3' (FIG. 7). As such, rotation of the first locking arm 66 (e.g., caused by turning key 86) transfers the rotational movement to the second locking arm 68, thereby rotating arm 68 about the pivot point 'P2'.

The latch arm 144 extends outwardly from the main body 140 and generally includes a proximal end 162 and a distal end 164. The proximal end 162 is coupled to the main body 140, and the distal end 164 includes a hook or catch 166 configured to selectively engage a bin striker 168 (FIG. 5).

In one example operation, vehicle storage compartment 10 may begin in the closed and locked position shown in FIGS. 1 and 7. In this position, the first locking arm catch 136 engages the bin striker 138, and the second locking arm catch 166 engages the bin striker 168, as shown in FIG. 5, thereby preventing lifting of the armrest door 16 to access storage cavities 24, 38. It will be appreciated that the locking assembly 18 is separate and independent of the storage tray latching mechanism 32 and the armrest door latching mechanism 50. Thus, both handle portions 40 and 56 can be engaged to rotate the latching mechanisms 32, 50, however, the vehicle storage compartment 10 remains locked. This is unlike some known storage compartments that prevent movement of handles when the storage compartment is locked.

To unlock the vehicle storage compartment 10, the vehicle key 86 is inserted into the lock 62 and rotated, for example, clockwise as shown in FIG. 7. However, it will be appreciated that storage compartment 10 can be constructed to operate in a similar fashion with counterclockwise movement of key 86. Clockwise rotation of lock 62 causes clockwise rotation of lock link 64, which rotates the lock link projection 100 into contact with the contact surface 124 of first lock arm contact ramp 118.

Such contact causes upward movement of connecting arm 112 and rotates first locking arm 66 counterclockwise about pivot point 'P1' (as shown in FIG. 7). The counterclockwise movement draws latch arm 114 inboard and away from bin striker 138 such that catch 136 is no longer engaged therewith.

Moreover, the rotation of first locking arm 66 about pivot point 'P1' causes connecting arm distal end 128 to move upward (as shown in FIG. 7), which also causes upward movement of second locking arm connecting arm distal end 158 as they rotate about pivot point 'P3'. This upward movement of the connecting arm 142 causes the second locking arm 68 to rotate clockwise about pivot point 'P2' (as shown in FIG. 7). This clockwise movement draws latch arm 144 inboard and away from bin striker 168 such that catch 166 is no longer engaged therewith. As such, with the catches 136, 166 disengaged from the bin strikers 138, 168, the locking assembly 18 is moved to the unlocked position and subsequent opening movement of the storage tray 14 and/or the armrest door 16 is enabled.

Described herein are systems and methods for locking a vehicle storage compartment. The systems include a locking assembly having a housing and a pair of locking arms rotatably coupled thereto. Use of a vehicle key to turn a lock subsequently rotates the pair of locking arms to engage or disengage a base bin of the vehicle storage compartment to transition the storage compartment between locked and unlocked positions. The locking assembly is mechanically separate and independent of the opening latch mechanisms of lids/doors of the storage compartment such locking of the locking assembly does not prevent movement of the latch mechanisms.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle storage compartment comprising:
   a base bin defining a storage cavity and configured to couple to a vehicle floor;
   a door coupled to the base bin and configured to move between a closed position and an open position, the door having a latch mechanism configured to selectively engage the base bin to facilitate maintaining the door in the closed position; and
   a locking assembly coupled to the door and configured to move between a locked position and an unlocked position, the locking assembly configured to selectively engage the base bin in the locked position to facilitate preventing movement of the door from the closed position to the open position,
   wherein the locking assembly is separate and independent of the latch mechanism such that the latch mechanism remains movable when the locking assembly is in the locked position.

2. The vehicle storage compartment of claim 1, wherein the locking assembly includes a housing coupled to the door, the housing defining a lock cavity and a transverse locking arm slot.

3. The vehicle storage compartment of claim 2, wherein the locking assembly includes:
   a lock link disposed within the lock cavity; and
   first and second locking arms disposed within the transverse locking arm slot.

4. The vehicle storage compartment of claim 3, wherein a lock and tumbler is disposed within a bore formed in the lock link.

5. The vehicle storage compartment of claim 4, wherein the lock and tumbler is configured to receive a vehicle key.

6. The vehicle storage compartment of claim 3, wherein the first and second locking arms are rotatably coupled to the housing.

7. The vehicle storage compartment of claim 6, wherein the first and second locking arms are rotatably coupled to each other.

8. The vehicle storage compartment of claim 3, wherein the first locking arm comprises:
   a main body;
   a connecting arm extending from the main body and coupled to the second locking arm; and
   a latch arm extending from the main body and having a catch configured to selectively engage a first bin striker of the base bin.

9. The vehicle storage compartment of claim 8, wherein the first locking arm main body includes an aperture,
   wherein a pin extends through the aperture to rotatably couple the first locking arm to the housing.

10. The vehicle storage compartment of claim 8, wherein the second locking arm comprises:
    a main body;
    a connecting arm extending from the main body and coupled to the connecting arm of the first locking arm; and
    a latch arm extending from the main body and having a catch configured to selectively engage a second bin striker of the base bin.

11. The vehicle storage compartment of claim 10, wherein the second locking arm main body includes an aperture,
    wherein a pin extends through the aperture to rotatably couple the second locking arm to the housing.

12. The vehicle storage compartment of claim 2, wherein the latch mechanism is rotatably coupled to the housing.

13. The vehicle storage compartment of claim 12, wherein the latch mechanism comprises:
    a pawl rotatably coupled to the housing;
    a handle portion coupled to the pawl; and
    a latch arm configured to selectively engage the base bin to facilitate maintaining the door in the closed position.

14. The vehicle storage compartment of claim 1, further comprising:
    a storage tray defining a second storage cavity and coupled to the base bin, the storage tray configured to move between a closed position and an open position, the storage tray having a second latch mechanism configured to selectively engage the base bin to facilitate maintaining the storage tray in the closed position;
    wherein the locking assembly is mechanically separate and independent of the first and second latch mechanisms such that the first and second latch mechanisms remain movable when the locking mechanism is in the locked position.

15. A vehicle storage compartment comprising:
    a base bin defining a first storage cavity and configured to couple to a vehicle floor;
    a storage tray defining a second storage cavity and coupled to the base bin, the storage tray configured to move between a closed position and an open position, the storage tray having a first latch mechanism configured to selectively engage the base bin to facilitate maintaining the storage tray in the closed position;
    an armrest door coupled to the base bin and configured to move between a closed position and an open position, the armrest door having a second latch mechanism configured to selectively engage the base bin to facilitate maintaining the armrest door in the closed position; and
    a locking assembly coupled to the armrest door and configured to move between a locked position and an unlocked position, the locking assembly configured to selectively engage the base bin in the locked position to facilitate preventing movement of the armrest door from the closed position to the open position,
    wherein the locking assembly is mechanically separate and independent of the first and second latch mechanisms such that the first and second latch mechanisms remain movable when the locking mechanism is in the locked position.

16. The vehicle storage assembly of claim 15, wherein the storage tray and the armrest door are hingedly coupled to the base bin.

\* \* \* \* \*